(12) United States Patent
Rudi

(10) Patent No.: US 7,227,716 B2
(45) Date of Patent: Jun. 5, 2007

(54) TWO TAPE, FOUR REEL CARTRIDGE AND DRIVE FOR WIDE MAGNETIC RECORDING TAPE

(75) Inventor: Guttorm Rudi, Fjellhamar (NO)

(73) Assignee: O-Mass AS (NO)

( * ) Notice: Subject to any disclaimer, the term of this patent is extended or adjusted under 35 U.S.C. 154(b) by 1193 days.

(21) Appl. No.: 10/057,387

(22) Filed: Jan. 25, 2002

(65) Prior Publication Data

US 2003/0142437 A1    Jul. 31, 2003

(51) Int. Cl.
G11B 5/008   (2006.01)
G11B 23/087  (2006.01)
D03J 5/08    (2006.01)
G03B 23/087  (2006.01)

(52) U.S. Cl. ............ 360/96.1; 242/132; 242/341; 242/345

(58) Field of Classification Search ............ 242/341, 242/345, 132; 360/132, 260, 261.3, 96.1, 360/96.2
See application file for complete search history.

(56) References Cited

U.S. PATENT DOCUMENTS

| | | | | |
|---|---|---|---|---|
| 3,290,438 A | * | 12/1966 | Okamura | 360/64 |
| 4,195,796 A | | 4/1980 | Osanai | 242/199 |
| 4,899,239 A | * | 2/1990 | Kido | 360/261 |
| 5,911,379 A | * | 6/1999 | Adams | 242/346 |
| 5,963,395 A | * | 10/1999 | Rudi | 360/96.1 |
| 6,206,313 B1 | | 3/2001 | Rudi | 242/341 |
| 6,267,313 B1 | * | 7/2001 | Saliba et al. | 360/132 |

FOREIGN PATENT DOCUMENTS

| | | |
|---|---|---|
| GB | 1 426 889 | 3/1976 |
| JP | 59-193587 | 11/1984 |

* cited by examiner

*Primary Examiner*—Thai Q. Tran
*Assistant Examiner*—Syed Y. Hasan
(74) *Attorney, Agent, or Firm*—Schiff Hardin LLP

(57) ABSTRACT

A cartridge for a magnetic recording tape has a first pair of reels rotatably mounted therein which carry a first wide magnetic recording tape, and a second pair of reels disposed therein which carry a second wide magnetic recording tape. The reels are disposed in the cartridge so that each of the first and second wide magnetic recording tapes spans a central space, which is adapted to receive a magnetic recording head of a tape drive, when the cartridge is inserted in the tape drive. A corresponding tape has four drive motors with respective drive shafts, that respectively engage the four reels of the cartridge for transporting the first and second recording magnetic recording tapes across the central opening. The drive has a recording head and a recording head positioning assembly for selectively positioning the recording head at any location along the width of the first and second wide magnetic recording tapes.

11 Claims, 5 Drawing Sheets

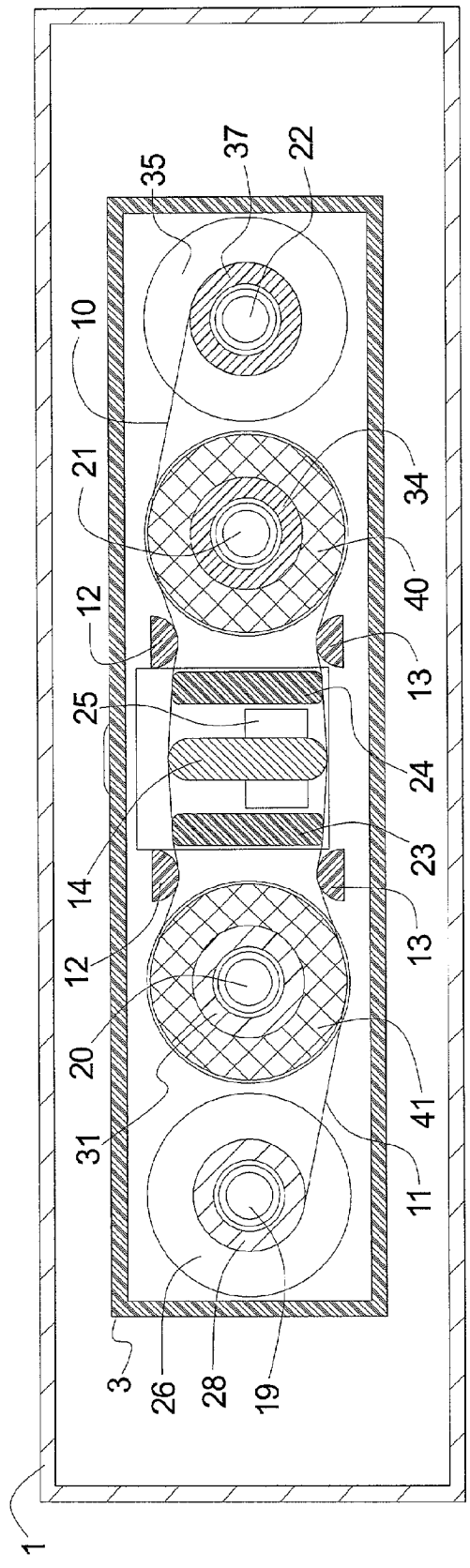
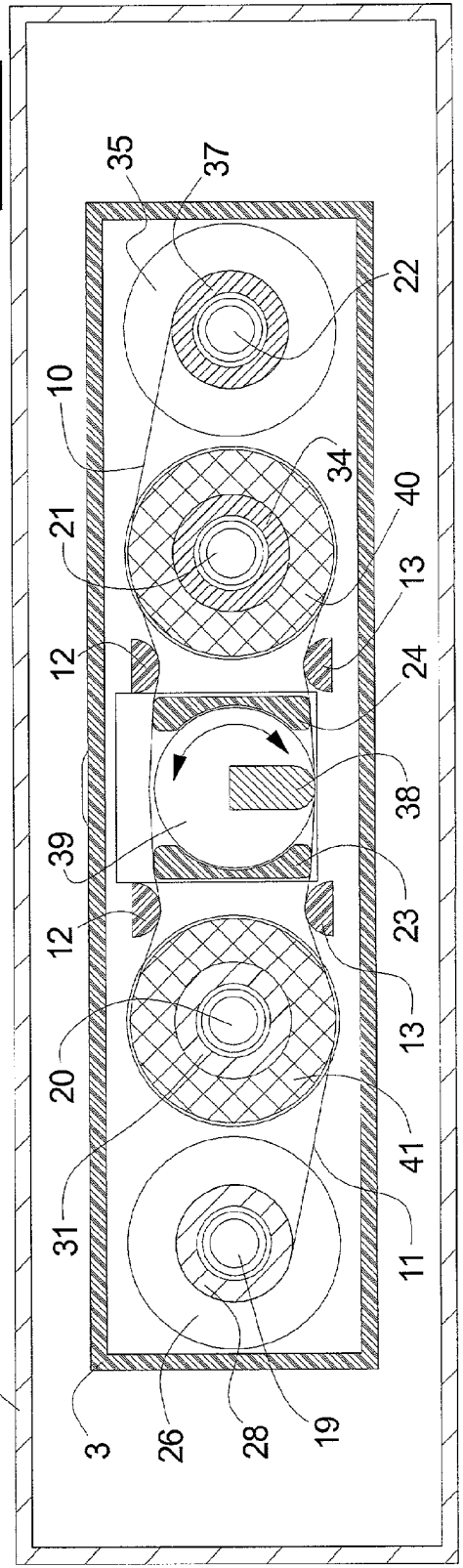
FIG. 8
FIG. 9

TWO TAPE, FOUR REEL CARTRIDGE AND DRIVE FOR WIDE MAGNETIC RECORDING TAPE

BACKGROUND OF THE INVENTION

1. Field of the Invention

The present invention is directed to a tape cartridge which contains magnetic recording tape, in particular a cartridge containing an extremely wide tape which allows fast access time to data recorded on the tape, as well as a drive unit for such a tape cartridge.

2. Description of the Prior Art and Related Subject Matter

The use of magnetic tape as a medium for data recording has the significant advantages of a relatively low cost and a relatively large recording surface area. Nevertheless, conventional magnetic tape has certain disadvantages associated therewith.

A first of these disadvantages is that tape is a sequential medium, which means that when a data transfer head is located at a beginning of a tape, it is necessary for the tape to be transported along its entire length in order to retrieve (or re-write) information at the end of the tape.

A second disadvantage is that, due to the desire and necessity of storing as much data as possible within an available tape area, the data transfer head technology as well as the recording media technology are pushed to their quality limits.

Moreover, many existing drives and cartridges must be designed within specified form factors, in order to satisfy standardization requirements. As an increasing number of functions become available, which are desired to be accommodated in a drive or on a tape, data storage area or other functions must be sacrificed to accommodate the new, additional functions, or some type of compromise must be reached in the overall design.

Among the more important market requirements which are expected in the near future for data storage on tape is that the need for higher storage capacity will continue to increase, at an even faster rate than previously. As discussed below, for example, the storage capacity of a currently available single cartridge is not sufficient for unattended backup during a longer period of time, and therefore so-called autoloader systems have been developed to automatically insert and remove a number of cartridges in a sequence.

Further market requirements are expected to be a need for faster time to access data, a need for an increased data transfer rate, a lower cost per MB (megabyte) and an overall improved quality and reduced cost.

As noted above, the limited data storage capacity of conventional cartridges has resulted in the development of autoloader systems. Conventional autoloader systems, however, are not a satisfactory solution to the problem of storing a large amount of data in an unattended backup procedure over a relatively long period of time. Several disadvantages exist with regard to currently available autoloader systems.

Because such autoloader systems make use of a large number of cartridges, the cartridges are made relatively small, and therefore have a limited space available for use for data storage. Typically, six to ten of such cartridges must be put in a magazine in order to have sufficient storage area (capacity). Because of the relatively small size of the cartridges, the drive is also made small, in order to match standardized form factors. The drive is disposed in a system housing, which also contains robotics, electronics and software needed for loading an unloading the cartridges.

The relatively large number of components, and therefore the relatively high cost, associated with conventional autoloader systems makes the use of such systems an unattractive alternative for a customer who merely wants long term data backup.

To address these problems, a tape cartridge and a drive for extremely wide tape are disclosed in co-pending U.S. application Ser. No. 09/691,165, filed Oct. 19, 2000, the teachings of which are incorporated herein by reference. The tape cartridge and drive described therein accommodate tape having an extremely wide width, such as a width that is greater than approximately 24 mm, or in a range between approximately 24 mm and approximately 127 mm.

The width of this extremely wide tape, therefore, is greater than that of a conventional magnetic recording tape by a factor of 6 to 10 times. Because the tape has this extremely wide width, the total tape length can be made significantly shorter while still making the same total area available for data storage. Making the tape shorter, however, requires less time for winding and unwinding the tape from the hubs on which it is carried in order to access data at a particular location on the tape.

It is important, however, that the housing for accommodating such extremely wide tape have the same, or substantially the same, form factor as conventional recording cartridges, so as to be accommodated in the openings for conventional tape cartridges in tape drives and auto loaders and magazines. This means that the axes of rotation of the tape hubs in cartridges for accommodating extremely wide tape will proceed parallel to a "longer" dimension of the cartridge housing, rather than perpendicular to the shortest dimension (height) as in a conventional cartridge housing. Given a length of extremely wide tape which is necessary to provide the same total area available for recording data on the tape as a conventionally sized tape, such a length of extremely wide tape can be accommodated in a housing having a height which is comparable to the height of a conventional tape cartridge only when the tape is substantially evenly distributed in respective tape packs on the two hubs in the housing. When any significant amount of extremely wide tape is wound onto one of the hubs, the diameter on the tape pack on that hub increases beyond the standard height of a conventional cartridge housing.

This problem could be addressed by simply providing a lesser length of extremely wide tape in the cartridge, so that even when all of the tape is wound on one tape hub in one tape pack, the diameter of that tape pack still would not exceed the height of a standard tape cartridge.

This would defeat one of the advantages of employing extremely wide tape, however, by decreasing the total area available for recording data.

To allow a longer length of wide magnetic recording tape to be accommodated in a tape cartridge having a size which conforms to a standard form factor, co-pending U.S. application Ser. No. 09/859,328, filed May 16, 2001, the teachings of which are incorporated herein by reference, discloses a tape cartridge for wide magnetic tape, and a drive therefor, wherein the cartridge housing is formed by two parts which are slidable relative to each other along the direction of the housing height. When the two cartridge portions are in a non-expanded state, the cartridge exhibits a standard form factor, so that it can be inserted into conventionally sized openings in storage and drive equipment. After insertion in a tape drive of the type also disclosed in this co-pending application, the housing portions are slidably moved apart so as to have an interior spacing therebetween which allows substantially all of the tape to be wound in a single tape pack on one of the hubs. For storage purposes, the tape is wound in two tape packs of substantially equal diameter on the respective hubs, thereby allowing the aforementioned standard form factor to be maintained, but in use, as noted above, it is possible for all of the tape to wound on only one of the hubs, without being limited by the interior dimension of the cartridge.

In some circumstances, however, the access time to data stored on the magnetic tape still may be not be sufficiently rapid.

SUMMARY OF THE INVENTION

It is an object of the present invention to provide a magnetic recording tape cartridge for extremely wide magnetic recording tape and a tape drive therefor, which even further improve the access time to the data stored on the tape, as compared to the devices described above.

This object is achieved in accordance with the principles of the present invention in a tape cartridge for extremely wide magnetic recording tape having two magnetic recording tapes contained in a single housing, respectively wound on two pairs of reels in the housing. Thus the housing contains a total of four reels, with one of the magnetic recording tapes being wound and unwound between two of those reels, and the other magnetic recording tape being wound and unwound between the other two of these four reels. The housing has an opening which allows access, for a recording head, to a central space in the interior of the housing, and the pairs of reels with the respective recording tapes wound thereon are oriented in the housing so that each of the magnetic recording tapes spans the central space when being conveyed between the two reels on which it is wound. If the cartridge is arbitrarily designated as having one wall which forms a top of the cartridge housing and another wall parallel thereto which forms a bottom of the housing, one of the magnetic tapes can proceed across the central space adjacent a top of the cartridge housing, and the other of the magnetic recording tapes can proceed across the central space adjacent to a bottom of the housing.

The cartridge housing can be expandable, as described in the aforementioned co-pending U.S. application Ser. No. 09/859,328.

The inventive drive for the inventive cartridge has four drive motors, each having a drive shaft. The respective drive shafts engage the four reels of the inventive cartridge, when the cartridge is inserted into the tape drive. The drive also includes a recording head positioning assembly which carries at least one read/write head so that the read/write head is disposed in the central space when the cartridge is inserted into the housing. The recording head positioning assembly moves the read/write head along the width of the two magnetic recording tapes to transfer data to and from those tapes. The movement of the recording head is along a direction parallel to the rotational axes of the four reels, which are also parallel to each other.

In a first embodiment of the inventive tape drive, a single read/write head is used, and the recording head positioning assembly includes a rotatable support so that the read/write head can be selectively moved to a first position for data transfer to one of the magnetic recording tapes, and to a second position for data transfer with the other of the magnetic recording tapes. In this embodiment, data can be read from, or written on, only one of the two recording tapes at a time.

In a second embodiment of the inventive tape drive, dual read/write heads are used, which are mounted 180° opposite each other. In this embodiment no rotation is necessary; both read/write heads are simultaneously in a data transfer position relative to the respective magnetic tapes. The read/write heads, however, can be operated independently of each other, so that data transfer can take place with respect to only one of the tapes at a time, if desired, or data transfer can optionally be simultaneously undertaken with respect to both tapes.

DESCRIPTION OF THE DRAWINGS

FIG. 8 is a sectional view through the inventive tape drive with an inventive tape cartridge loaded therein, in an embodiment employing a dual recording head.

FIG. 9 is a sectional view through an inventive tape drive with an inventive tape cartridge loaded therein, in an embodiment with a single recording head.

DESCRIPTION OF THE PREFERRED EMBODIMENTS

Figure 1:
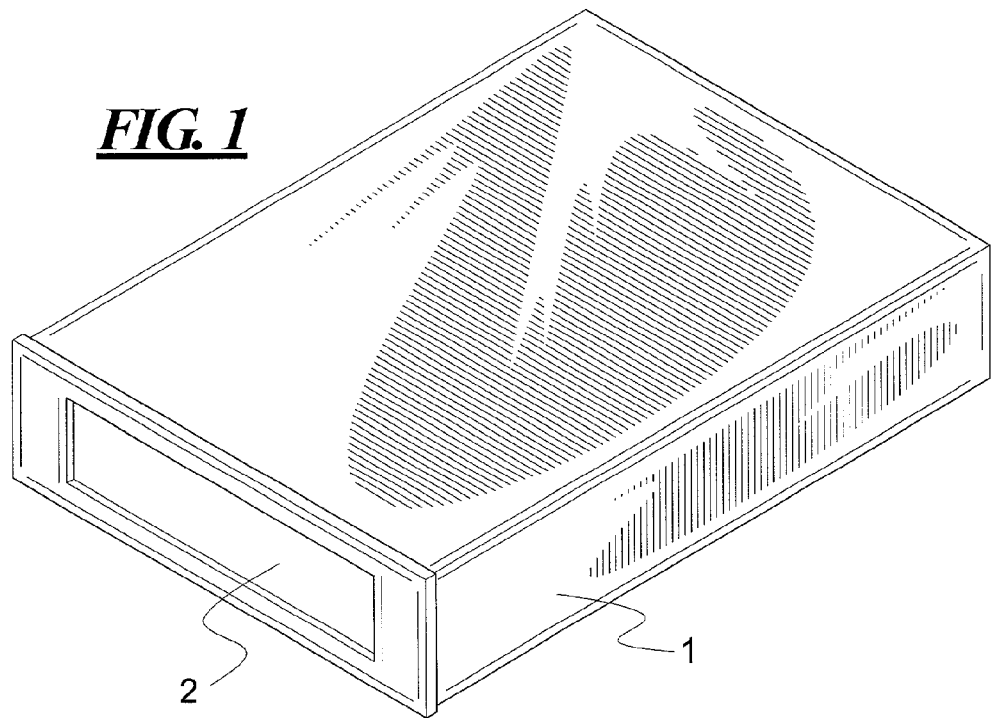
FIG. 1 is a perspective view of the exterior of a tape drive constructed and operating in accordance with the principles of the present invention.

The inventive tape drive is shown from the exterior in FIG. 1, and has a drive housing 1 with an access opening therein which is normally closed, in a known manner, by an access door 2. The access opening allows insertion of a cartridge having a standard form factor into the tape drive.

Figure 2:
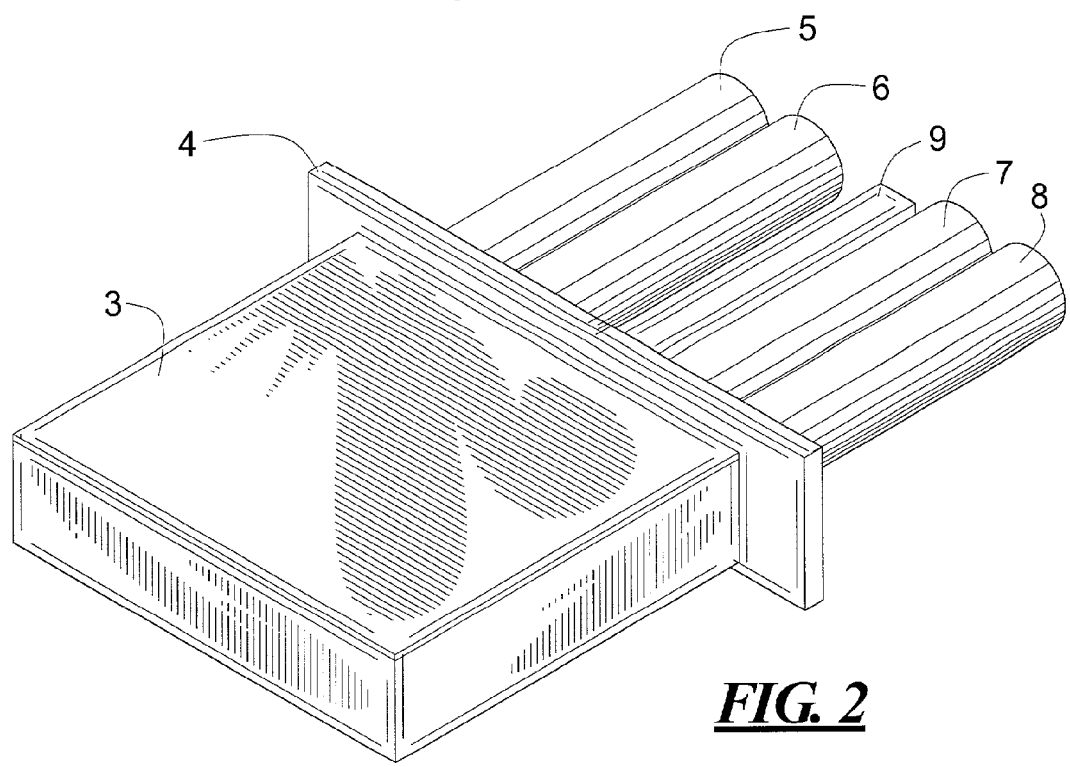
FIG. 2 is a perspective view of the interior components of the inventive tape drive of FIG. 1 with the housing removed, shown engaging a tape cartridge in accordance with the invention.

The basic interior components of the tape drive of FIG. 1 are shown in FIG. 2, engaging a tape cartridge 3 constructed in accordance with the present invention. When the tape cartridge 3 is fully inserted into the housing 1 of the tape drive, it comes to abut a base plate 4 rigidly mounted in the housing 1. Mounted to the base plate 4 are four drive motors 5, 6, 7 and 8. Also mounted to the base plate 4 is a recording head positioning assembly, of which a slide 9 can be seen in FIG. 2.

Figure 3:
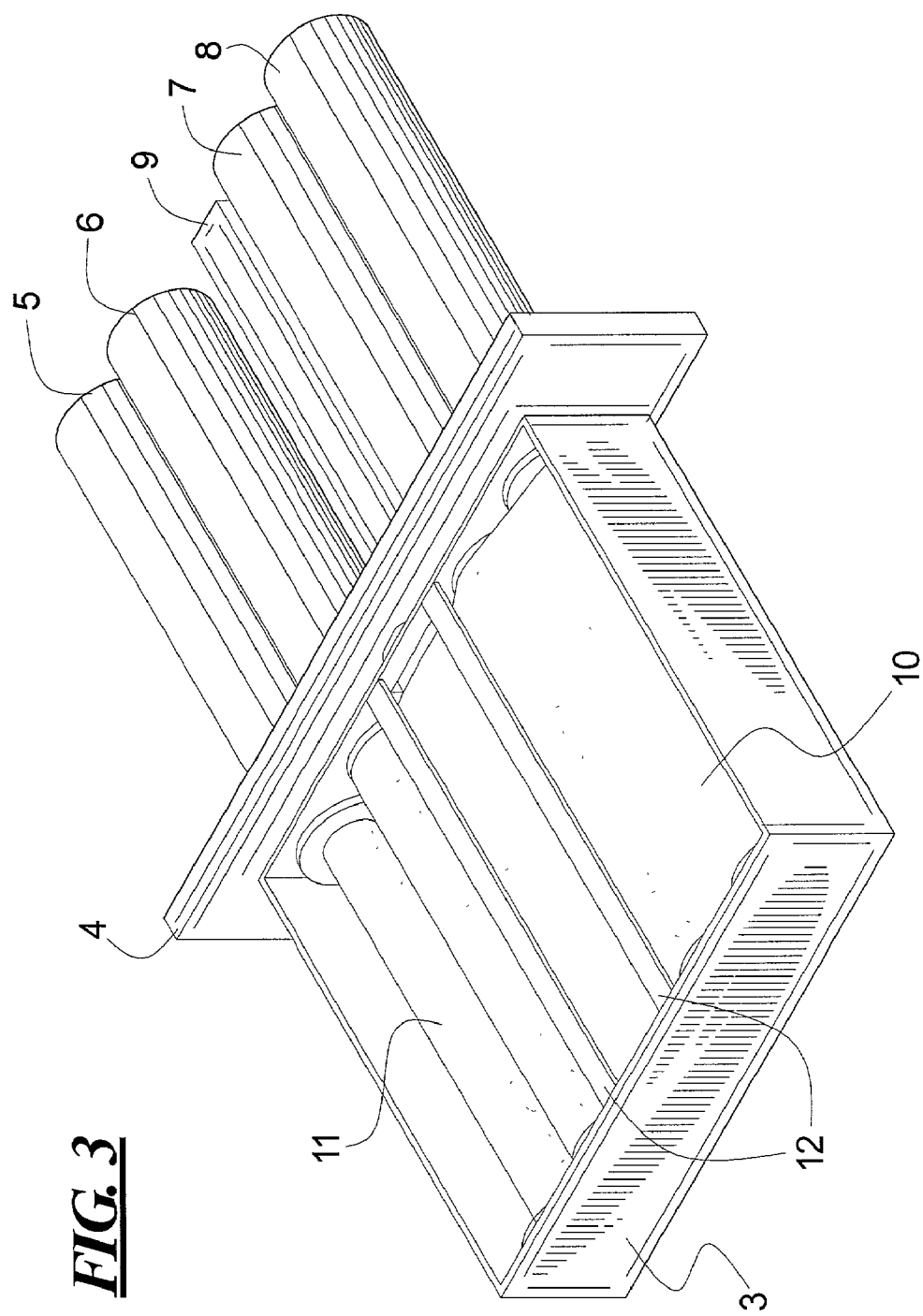
FIG. 3 is a perspective view of the components shown in FIG. 2, with the top of the tape cartridge removed to expose the interior components thereof.
Figure 4:
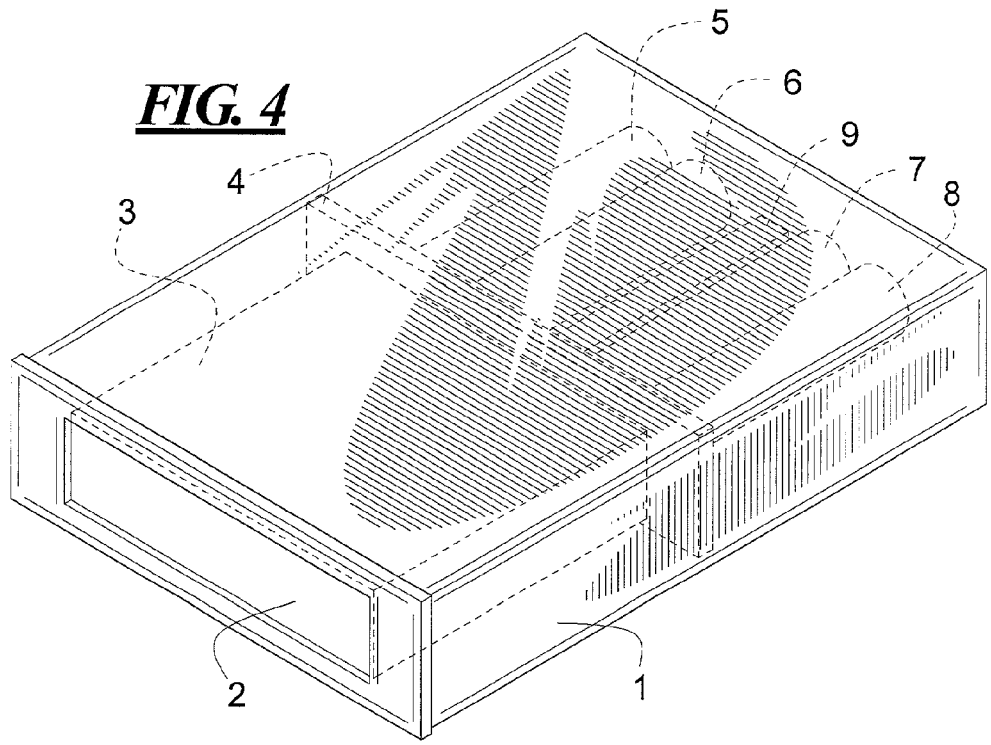
FIG. 4 is a perspective view of the inventive tape cartridge showing how the components shown in FIG. 2 are accommodated therein.

FIG. 3 shows the same components as in FIG. 2, but with the top of the cartridge 3 removed to show the interior components thereof. As can be seen in FIG. 3, the cartridge 3 contains two wide tapes 10 and 11, respectively wound on two pairs of reels, so that there are a total of four reels in the cartridge 3. The position of the components shown in FIG. 2 within the drive housing 1 is shown in FIG. 4.

Figure 5:
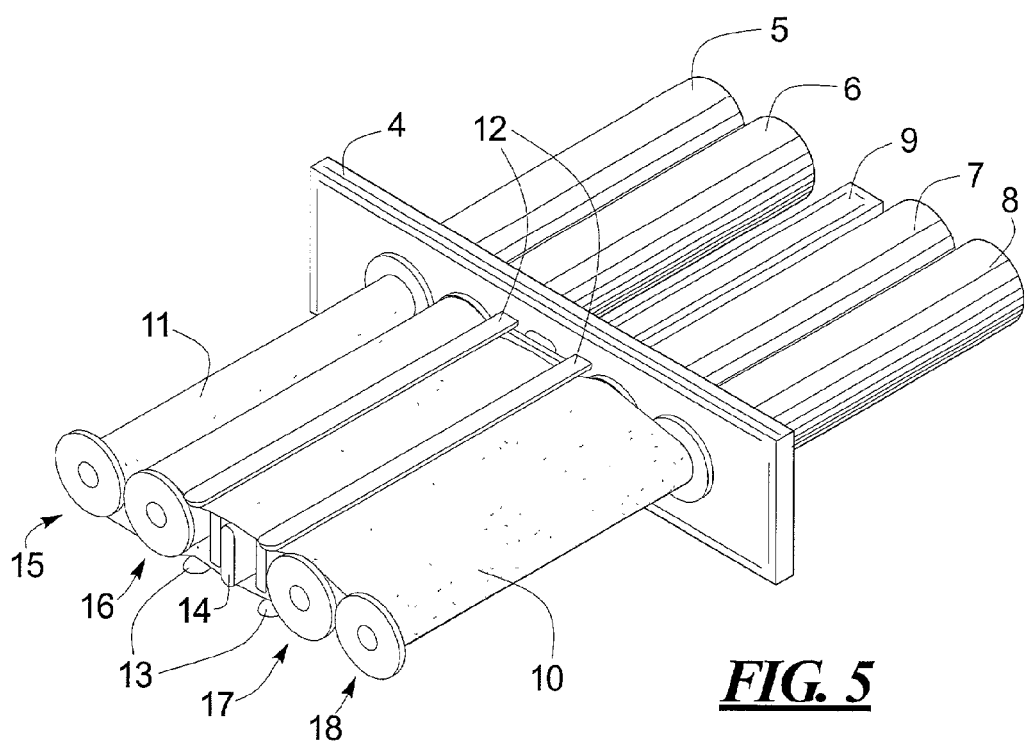
FIG. 5 shows the components of FIG. 2 with the entirety of the housing of the cartridge removed to expose the interior components thereof.

FIG. 5 shows the same components as in FIGS. 2 and 3, but with the entirety of the housing of the cartridge 3 removed, so that the four reels 15, 16, 17 and 18 can be more clearly seen. As also shown in FIG. 5, between the reels 16 and 17, there is a central space, which is occupied by a recording head 14 and the remainder of the recording head positioning assembly, the details of which can be more clearly seen in other figures. The recording head 14 and the head positioning assembly proceed into this central space as the cartridge 3 is inserted into the drive housing 1. For this purpose, the cartridge 3 has an access door in one of its lateral walls between which the reels 15, 16, 17 and 18 are mounted, as described in the aforementioned co-pending application Ser. No. 09/859,328. As can be seen in FIG. 5, the magnetic recording tape 10 proceeds across this central space when being wound and unwound between the reels 16 and 18. The magnetic recording tape 11 also proceeds across this central space when being wound and unwound between the reels 15 and 17. The tape 10 is guided by upper guides 12, which are mounted to the top of the cartridge 3, so that the tape 10 is moved in data transfer relationship relative to the recording head 14. Similarly, the tape 11 is guided by lower guides 13, which are mounted to a bottom of the cartridge 3, as it spans the central opening, so as to be in data transfer relationship with the recording head 14. In the embodiment shown in FIG. 5, the recording head 14 is a dual recording head, i.e., it has two read/write elements which are simultaneously in data transfer relationship with the respective tapes 10 and 11.

The tapes 10 and 11 are wide magnetic recording tape, having a width (i.e., a dimensioned measured in a direction along the rotational axes of the reels 15, 16, 17 and 18, and perpendicular to the tape transport direction) which is greater than approximately 24 mm, or in a range between approximately 24 mm and approximately 127 mm.

Figure 6:
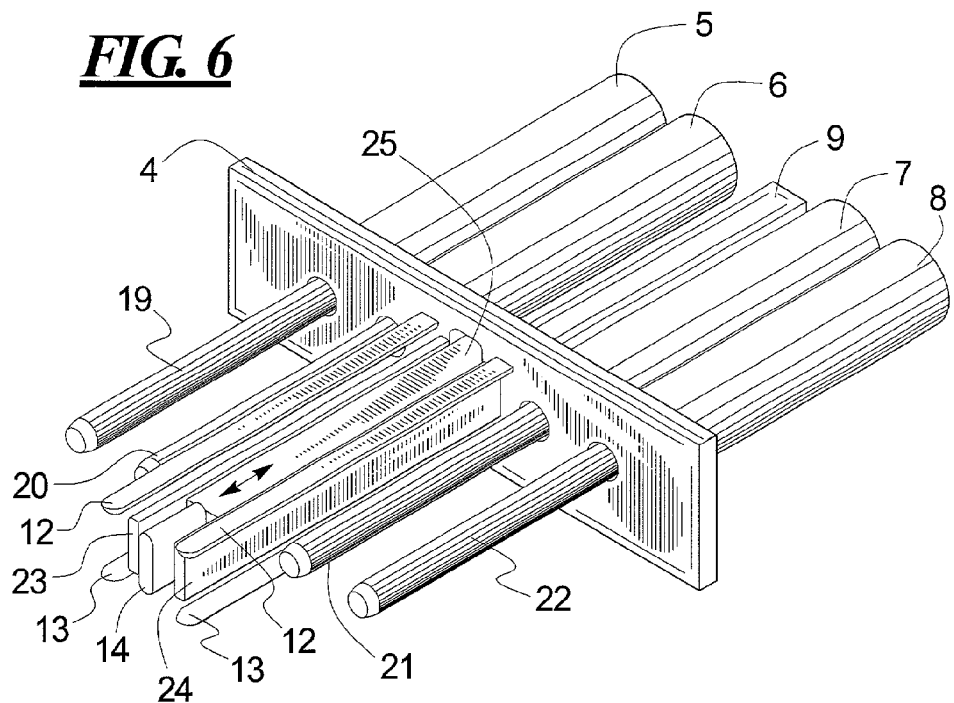
FIG. 6 shows the interior components of the tape drive, with the housing removed.

The components of the tape cartridge are shown in FIG. 6, without engagement with a tape cartridge. As can be seen in FIG. 6, the drive motors 5, 6, 7 and 8 have respective drive shafts 19, 20, 21 and 22. As also can be seen in FIG. 6, the recording head positioning assembly has a mount 25 which is movable in the directions indicated by the double arrow so as to selectively position the recording head 14 at any position along the width of the tapes 10 and 11. Data are written in parallel tracks along the lengths of the tapes 10 and 11, the position of each track being defined by the position of the recording head 14 set by movement of the mount 25 along the slide 9. Any suitable mechanism can be employed for moving the mount 25 and the recording head 14 attached thereto in the direction of the double arrows, such as the mechanisms disclosed in co-pending U.S. application Ser. No. 10/052,826, filed Nov. 7, 2001.

As also shown in FIG. 6, the mount 25 is movable between two lateral guides 23 and 24.

Figure 7:
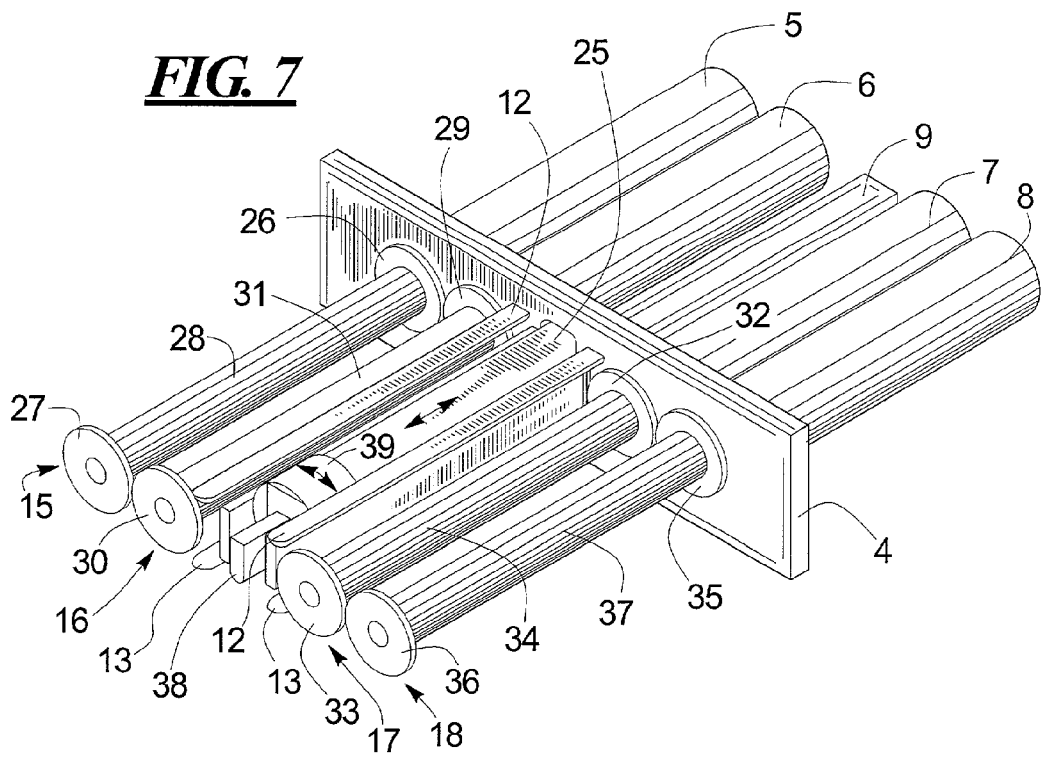
FIG. 7 shows the engagement of the tape drive components of FIG. 6 with respective reels of the inventive tape cartridge.

FIG. 7 shows how the respective reels 15, 16, 17 and 18 are mounted on the drive shafts 19, 20, 21 and 22. Each reel is composed of a hub and two flanges, the hub having a central bore therein which receives the respective drive shaft in a keyed manner, so that the hub co-rotates with the drive shaft. Thus, the reel 15 is formed by flanges 26 and 27 with a hub 28 therebetween, the reel 16 is formed by flanges 29 and 30 with a hub 31 therebetween, the reel 17 is formed by flanges 32 and 33 with a hub 34 therebetween, and the reel 18 is formed by flanges 35 and 36 with a hub 37 therebetween. The reels 15, 16, 17 and 18 are rotatably mounted in the cartridge 3 in a known manner.

In the embodiment shown in FIG. 7, the recording head 38 is a single read/write element, and thus can effect data transfer relative to the tapes 10 and 11 only one at a time. For this purpose, the recording head 38 is mounted on a rotatable support 39, which is rotatable as indicated by the curved double arrow so that the recording head 38 can be selectively positioned for data transfer with either of the tapes 10 and 11.

A cross-sectional view of the embodiment wherein the dual recording head 14 is used is shown in FIG. 8. The tapes 10 and 11 are shown in FIG. 8 in a state wherein the entirety of the tape 10 is wound in a single tape pack 41 on the hub 31, and the entirety of the tape 11 is wound in a single tape pack 40 on the hub 34. As noted earlier, if the housing cartridge 3 is rigidly constructed, the maximum diameter of the tape packs 40 and 41, and thus the maximum lengths of the tapes 10 and 11, is limited by the interior spacing between the top and bottom of the cartridge 3. In order to allow the use of longer lengths of the tapes 10 and 11, the cartridge 3 can have an expandable housing, as disclosed in the aforementioned co-pending U.S. application Ser. No. 09/859,328.

In a view similar to that of FIG. 8, FIG. 9 is a sectional view of the drive 1 with a cartridge 3 loaded therein, in the embodiment employing the single recording head 38. As indicated by the curved double arrow, the single recording head 38 is selectively positionable by the rotatable support 39 so as to be in data transfer relationship with either the tape 10 or the tape 11, one at a time.

Although modifications and changes may be suggested by those skilled in the art, it is the intention of the inventor to embody within the patent warranted hereon all changes and modifications as reasonably and properly come within the scope of his contribution to the art.

The invention claimed is:

1. A holder for wide magnetic recording tape comprising:
  four generally rectangular lateral walls each of equal height;
  an opening in at least one of said lateral walls allowing access to a central space inside said lateral walls;
  a first pair of tape hubs mounted between two opposite ones of said lateral walls for rotation around respective rotational axes proceeding through said two opposite ones of said lateral walls, said first pair of tape hubs having a first magnetic recording tape thereon for winding and unwinding in a transport direction between said first pair of tape hubs and spanning said central space;
  a second pair of tape hubs rotatably mounted between said opposite ones of said lateral walls for rotation around respective rotational axes, said second pair of tape hubs having a second magnetic recording tape thereon for winding and unwinding in said transport direction between said second pair of tape hubs and spanning said central space;
  said central space being defined at a first side thereof by one of the tape hubs in said first pair and at a second, opposite side thereof by one of the tape hubs in said second pair; and
  the respective rotational axes of said first pair of tape hubs and the respective rotational axes of said second pair of tape hubs all being parallel to each other and perpendicular to said transport direction.

2. A holder as claimed in claim 1 wherein the tape hubs in said first pair of tape hubs are rotatably mounted between said opposite ones of said lateral wells in alternation with the tape hubs in said second pair of tape hubs, with one tape hub in said first pair of tape hubs being disposed adjacent a first side of said central space and one tape hub of said second pair of tape hubs being disposed adjacent a second side of said central space, opposite said first side of said central space.

3. A holder as claimed in claim 1 wherein each of said first magnetic recording tape and said second magnetic recording tape has a width, measured perpendicular to said transport direction and parallel to said rotational axes of said first and second pairs of tape hubs, which is greater than approximately 24 mm.

4. A holder as claimed in claim 1 wherein each of said first magnetic recording tape and said second magnetic recording tape has a width, measured perpendicular to said transport direction and parallel to said rotational axes of said first and second pairs of tape hubs, which is a range between approximately 24 mm and approximately 127 mm.

5. A holder for magnetic recording tape comprising:
- a first pair of tape hubs having a first magnetic recording tape wound thereon;
- a second pair of tape hubs having a second magnetic recording tape wound thereon;
- a holder assembly in which said first and second pairs of tape hubs are rotatably mounted, said holder assembly having a central space therein, between one of the tape hubs in said first pair and one of the tape hubs in said second pair, with each of said first and second magnetic recording tapes spanning said central space; and
- said first and second magnetic recording tapes each being movable in a transport direction and having a width perpendicular to said transport direction of at least approximately 24 mm.

6. A holder as claimed in claim 5 wherein each of said first and second magnetic recording tapes has a width in a range between approximately 24 mm and 127 mm.

7. A tape drive comprising:
- a base plate;
- four drive motors mounted to said base plate, each of said motors having a drive shaft projecting through said base plate, the respective drive shafts of said motors being parallel to each other with respective spaces therebetween and including a central two of said drive shafts with a largest of said spaces therebetween;
- a magnetic recording head; and
- a head positioning assembly, on which said recording head is mounted, disposed between said central two of said drive shafts, said head positioning assembly selectively positioning said recording head along a direction parallel to said drive shafts.

8. A tape drive as claimed in claim 7 wherein said recording head is a dual recording head having first and second read/write elements disposed 180° opposite each other.

9. A tape drive as claimed in claim 7 wherein said recording head is a single recording head, having one read/write element, wherein said head positioning assembly further comprises a rotatable support on which said read/write element is mounted and being rotatable to selectively position said read/write element at respective positions which are 180° opposite each other.

10. A tape drive as claimed in claim 7 wherein said head positioning assembly comprises:
- a slide mounted to said base plate, a mount, to which said recording head is attached, slidable along said slide, and two lateral guides disposed on opposite sides of said mount to guide movement of said mount in said direction parallel to said drive shafts.

11. A tape drive as claimed in claim 7 wherein said drive shafts have respective rotational axes which, in combination, define a plane, and wherein said tape drive further comprises a first set of tape guides mounted to and projecting from said base plate parallel to said drive shafts and disposed above said plane, and a second pair of tape guides mounted to and projecting from said base plate parallel to said drive shafts below said plane.

* * * * *